United States Patent [19]
Salzmann

[11] Patent Number: 5,270,527
[45] Date of Patent: Dec. 14, 1993

[54] METHOD FOR AUTOFOCUSING OF MICROSCOPES AND AUTOFOCUSING SYSTEM FOR MICROSCOPES

[75] Inventor: Kurt Salzmann, Vienna, Austria

[73] Assignee: Leica AG, Vienna, Austria

[21] Appl. No.: 960,106

[22] Filed: Oct. 13, 1992

[30] Foreign Application Priority Data

Oct. 11, 1991 [DE] Fed. Rep. of Germany ....... 4133788

[51] Int. Cl.⁵ .................................................. G01J 1/20
[52] U.S. Cl. ............................... 250/201.3; 250/201.7
[58] Field of Search ............ 250/201.1, 201.3, 201.7, 250/216; 359/368, 370, 381

[56] References Cited

U.S. PATENT DOCUMENTS

| | | | |
|---|---|---|---|
| 4,639,587 | 1/1987 | Chadwick et al. | 250/201.3 |
| 4,935,612 | 6/1990 | Bierleutgeb | 250/201 |

FOREIGN PATENT DOCUMENTS 3707487 11/1987 Fed. Rep. of Germany .
3739223 6/1989 Fed. Rep. of Germany .

Primary Examiner—David C. Nelms
Attorney, Agent, or Firm—Foley & Lardner

[57] ABSTRACT

A method and system for autofocusing of microscopes. The image of the object or of a structure which is reflected onto the object is passed to two detectors or to two regions of a detector, one image being produced in front of, and one image behind, the respective detector in the focusing position, and the image definitions on the detectors being converted into electronic signals whose difference is used for setting the definition of the object, the distances between the images of this object or of this structure and the respective detectors being adjustable. Selective offset adjustments and "IR offset" correction adjustments can be used.

17 Claims, 6 Drawing Sheets

METHOD FOR AUTOFOCUSING OF MICROSCOPES AND AUTOFOCUSING SYSTEM FOR MICROSCOPES

BACKGROUND OF THE INVENTION

The invention relates to a method for autofocusing of a microscope having continuously or discontinuously variable objective magnification. It furthermore relates to a microscope having continuously or discontinuously variable objective magnification.

During microscopic investigations, it is often necessary to be able to change between different magnifications quickly. Objectives are used whose magnification varies over wide ranges, for example from 5× to 150× and beyond. Since such microscopes are also used to a large extent for monitoring in production, for example for routine investigations during wafer production, and since the visual focusing procedure is extremely tiring for the operator, attempts are being made to an increasing extent to bring autofocusing systems into use which permit quick automatic definition setting onto the object, which in individual cases is also more precise than would be possible visually.

However, it has been found that conventional autofocusing systems are overloaded when the objective magnification varies in a relatively large region, as indicated, for example, above. This overload is especially pronounced if the system is operating with radiation which prevents damage or a change in the semiconductor wafers to be observed. The overload is on the one hand caused by the fact that, in the case of increasing magnification, structures which are contained in the object or are generated on the object are smeared with respect to the edge contrast. This leads to increasing inaccuracy when this contrast, or variables derived from it, such as the high location frequencies content, are used for definition setting. A further problem noted by the applicant is that the depth of field on the image side increases with increasing magnification, with the square of the magnification of the objective to be precise. This may contribute to a considerable extent to the partially unexplained failure of conventional autofocusing systems in the case of differing objective magnifications.

DE-OS 3,707,487 discloses a method for autofocusing and a microscope having an autofocusing system which are capable of permitting reliable and optimum automatic definition setting onto the object even in the case of widely differing objective magnifications. However, it has been found that this type of autofocusing works completely only when sufficient details are visible on the object. Especially in the case of the direct illumination method, it is often necessary to focus on object points having few details—for example wafers in a first coating stage—or, in the extreme case, even on a pure mirror surface.

However, even when sufficient details are visible in the case of rapid movement of the object table with a simultaneously powerful objective magnification, the image may move so rapidly through the optimum definition setting that the electronics can no longer recognize it as being clear or unclear.

Depending on the selected objective magnification (aperture) and on the magnification changer stage in the stand of the known microscope, the definition signal curve shown in FIG. 3 of DE-OS 3,707,487, when going through focus, has a different shape. If the two definition signals are too far from one another, an undefined region exists between the two signals and the autofocus stops somewhere within this region.

On the other hand, the situation can arise that the two definition signal regions overlap too much, so that the resulting signal difference is too small. In the case of a conventional autofocusing system, these said difficulties were overcome by matching the definition signal curves to the respective objective/magnification changer combination by means of a zoom system in the autofocusing beam path to the fixed distance of the two TV targets.

DE-OS 3,739,223 describes a further development of the autofocusing method and system disclosed in DE-OS 3,707,487 such that reliable definition setting is ensured, especially during direct illumination operation, even in the case of objects which themselves only have few details. A pattern containing light-dark contrasts is projected into the object plane. The pattern which is projected onto the object generates an image there which is reflected and is used for definition setting. In this case, the term "signals" comprises both optical and electrical signals. Optical signals occur first in the autofocusing system, and are converted by electro-optical converters into electrical signals which can be subjected to further electronic processing and, after their processing, supply at least one control signal which can cause a displacement of the object and/or objective in the direction of the optimum definition setting, in a manner known per se, for example via suitable electric motors and drives.

However, it has been found to be disadvantageous for both known autofocusing systems to provide a zoom system in the autofocusing beam path, since it varies the magnification of both partial images in such a manner that, in an extreme case, the latter are much larger than the targets, which leads to loss of light intensity or, in another extreme case, are much smaller than the targets, which leads to an adverse effect on signal evaluation as a result of the remaining dark edge region.

SUMMARY OF THE INVENTION

It is an object of the present invention to improve the autofocusing method in such a manner that it no longer has the disadvantages of the known methods, thus ensuring error-free and unambiguous signal evaluation for determining an optimum focusing situation, even in the case of objects having critical surface topology.

This object is achieved according to the invention by a method in which the distances between the images of the object and the respective detector or detector region can be adjusted. It is furthermore achieved in the case of microscopes having autofocusing systems of the type mentioned initially that means are provided for changing the relative distance between the images of the object and the associated detectors or detector regions.

In more detail, the microscope of the instant invention has an objective with a variable magnification and includes: an autofocusing system whose beam path passes through the objective; two detector regions receiving two images from the beam path and outputting corresponding electrical signals, wherein a first image is produced in front of, and a second image behind, the respective detector region in the focusing position; means for converting image definitions on the detector regions to output electrical signals whose difference is used to set the definition of the object; at least one optical system being incorporated in the beam path of the autofocusing system, wherein the optical system changes the scale of the image produced on the detector regions when the objective magnification changes; and means for changing the relative distance between the images of the object and the detector regions.

Other objects, features, and advantages of the of the preferred embodiments.

BRIEF DESCRIPTION OF THE DRAWINGS

The present invention will be described in further detail with reference to the accompanying drawings, in which.

DETAILED DESCRIPTION OF THE PREFERRED EMBODIMENTS

Figure 1:
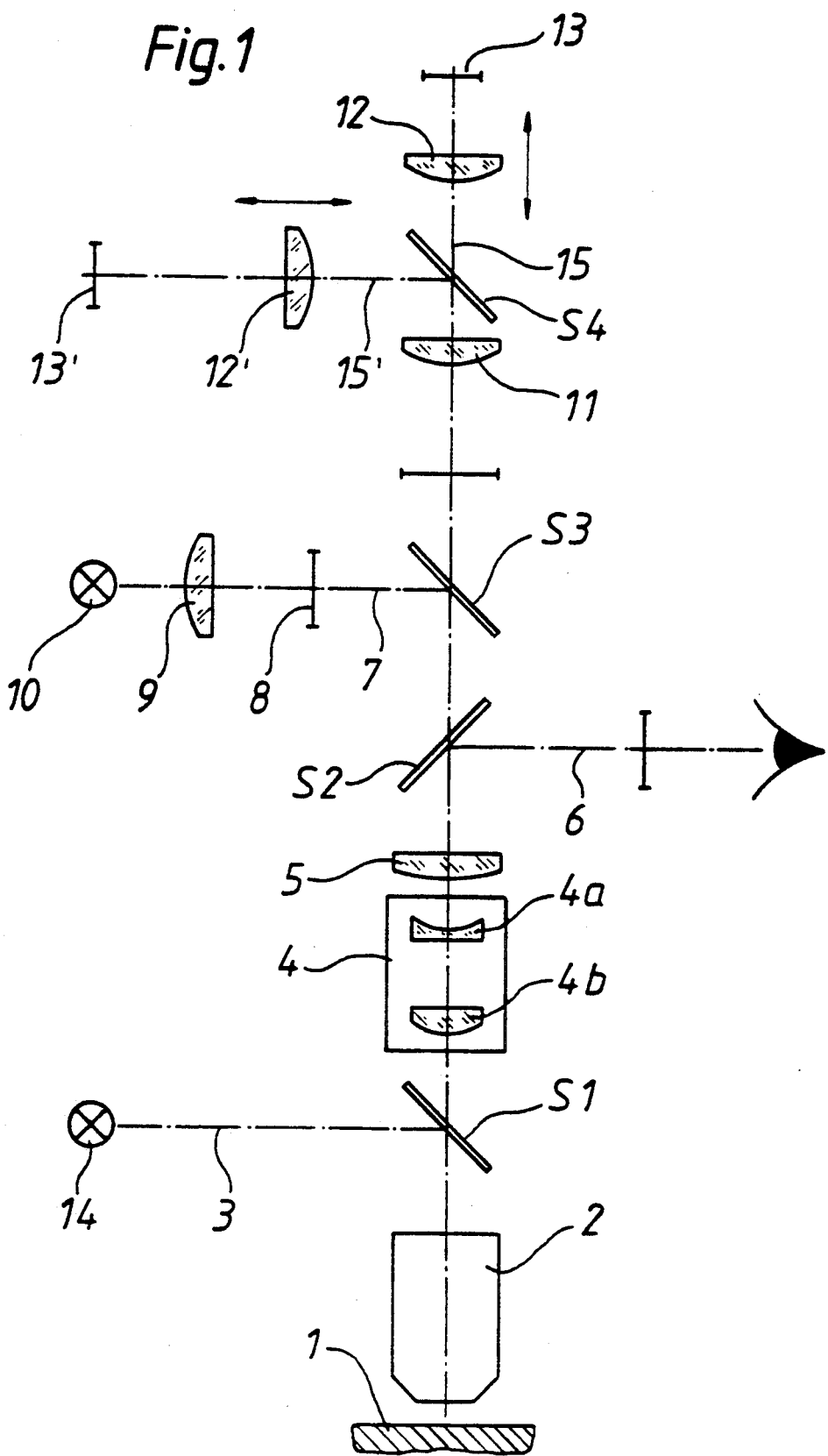
FIG. 1 shows an outline sketch of a microscope having an autofocusing system according to the invention in the "adjustment position"

FIG. 1 shows the beam path of a microscope having an autofocusing system according to the invention. Above an objective plane in which the object, that is not shown, is located, there is an objective 2, after which a first beam divider S1 is arranged. A direct illumination beam 3 from a visible light source 14 is reflected via this beam divider S1 into the optical system. There then follows, in the direction of the vertical axis of the autofocusing system, a magnification changer 4, whose pair of lenses 4a, 4b are in the effective position. Other lens combinations, that are not shown, within this magnification changer can likewise be moved into the effective position as desired. There now follows, seen in order from the position of the object, a telelens 5 and a second beam divider S2, preferably a dichroic beam splitter, which reflects observation beam 6 out the vertical axis of the autofocusing system. The microscope eyepiece itself is not shown.

Farther up the vertical axis of the system, a system which projects a contrasting pattern onto the object may be included. The part of the autofocusing beam which passes through the beam divider S2 reaches a third beam divider S3 which also reflects an IR illuminating beam 7 coaxially into the system towards the object. This IR beam 7 originates from an IR light source 10 and passes through a condenser 9 and a structure 8 for reflecting a pattern into the system arranged thereafter, for example a reticle or graticule. After passing through an autofocusing eyepiece 11, the part of the autofocusing beam which passes through the beam divider S3 reaches a fourth beam divider S4, by which a partial beam 15' is reflected out, and another partial beam 15 follows the course of the vertical axis of the autofocusing system. After passing through an autofocusing objective 12 or 12' which are arranged to be axially displaceable, the partial beams 15 and 15' respectively in each case reach detectors 13 and 13' arranged after the objectives.

Figure 2:
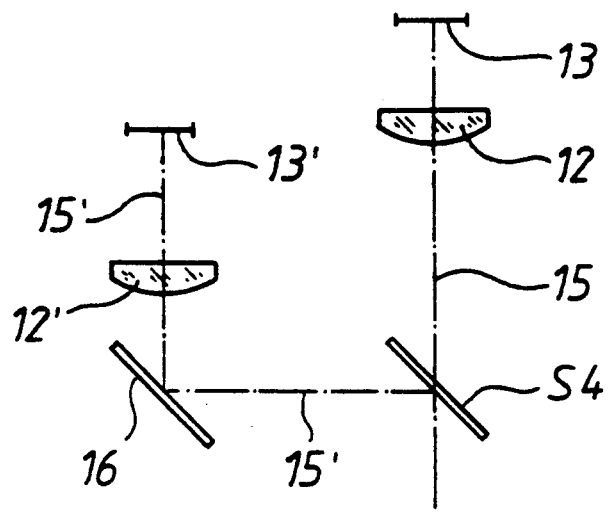
FIG. 2 shows a variant of the autofocusing system of FIG. 1 having a bent beam path of a partial beam, in a detailed representation.

In FIG. 2, the arrangement with respect to the partial beam 15' of the autofocusing beam path is designed in such a manner that, after leaving the fourth beam divider S4, its direction is changed by a deflection element 16. The divider surface of the beam divider S4 and the surface of the deflection element 16 preferably run parallel to one another, so that the axis of the partial beam 15 passing through the beam divider S4 and the axis of the partial beam 15', coming from the deflection element 16, of the autofocusing beam likewise run parallel. Finally, it follows from this course of the two partial beams 15 and 15' that the two detectors 13 and 13' respectively are arranged in mutually parallel planes. However, the positioning of the fourth beam divider S4 and/or of the deflection element 16 can also be selected such that the courses of the axes of the partial beams 15, 15' are not parallel, resulting in nonparallel arrangements of the detectors 13, 13' with respect to one another.

In FIG. 1 a single reflecting structure 8 is illuminated by an IR light source 10 and an intermediately connected condenser 9. The reflecting structure 8 is located in a plane which is conjugate to the object plane 1 and may, for example, be a graticule or a reticle. It is held by means of a motor, which is not shown, such that it can be displaced axially and replaced. The displacement capability is necessary because the reflecting structure 8 would not provide a clear image when an objective is used which is not corrected for the IR band, and would assume different focusing positions in the image plane (detector plane) depending on the objective 2 which is used at the time. This is compensated for by the motor drive, which displaces the reflecting structure 8 as a function of the objective 2 which is actually used—for example by an actuator, which is not shown, operated by the displacement of the objective revolver—correspondingly along the axis of the IR illuminating beam 7.

The outline sketch shown in FIG. 1 shows the "adjustment position" (basic position) of the apparatus according to the invention in which—with the object adjusted clearly in the eyepiece—the two images appear clearly at the same time on the two detectors 13, 13'.

Figure 3:
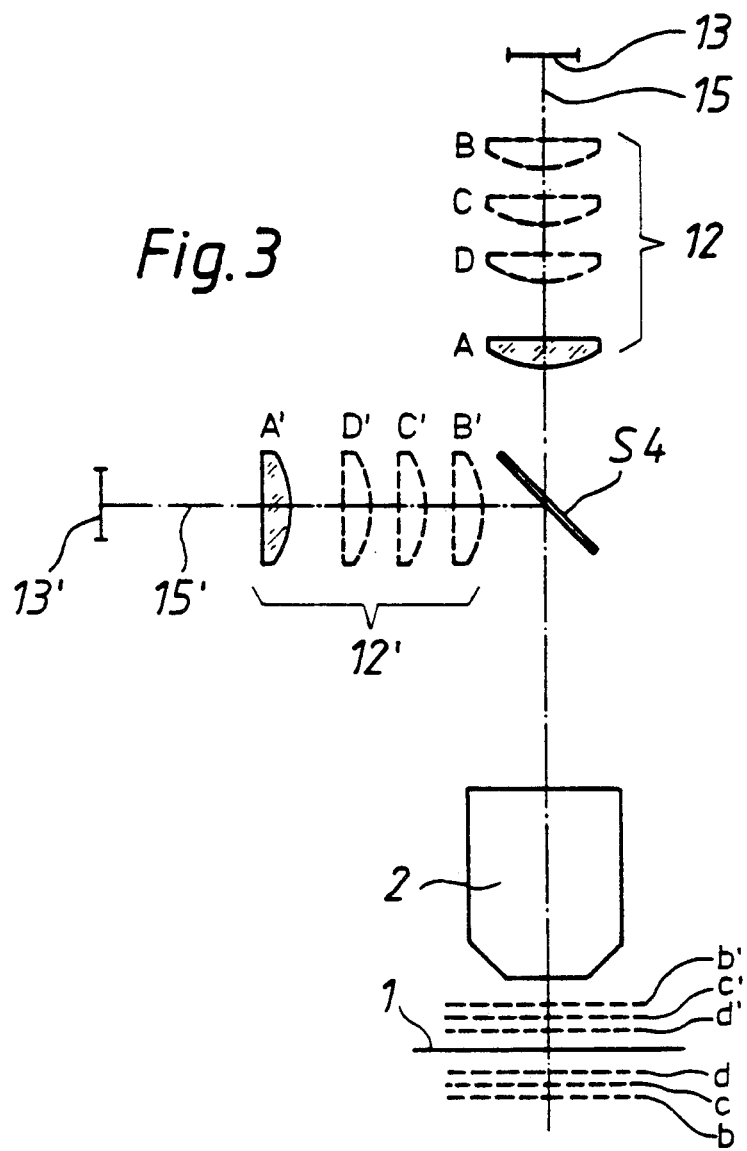
FIG. 3 shows a detailed representation according to FIG. 1 having differently positioned autofocusing objectives in the partial beam paths and the associated focusing planes in the object space.

Starting from this adjustment position, FIG. 3 shows the various positions of the two axially displaceable autofocusing objectives 12, 12' in respective pairs, and the focusing planes in the object space corresponding to them. In this case, the objective positions A, A' correspond to the object plane 1: the positions B and B' respectively of the objectives 12, 12' correspond in the object space to the two planes b and b' respectively, which are shown by dashed lines and come to rest symmetrically with respect to the object plane 1 (lens positions: A, A'), to be precise above (cf. b') and respectively below (cf. b) the object plane 1.

In an analogous manner, the focusing planes c and c' respectively correspond to the objective positions C, C', and the focusing planes d and d' respectively correspond to the associated objective positions D, D'.

Figure 4A:
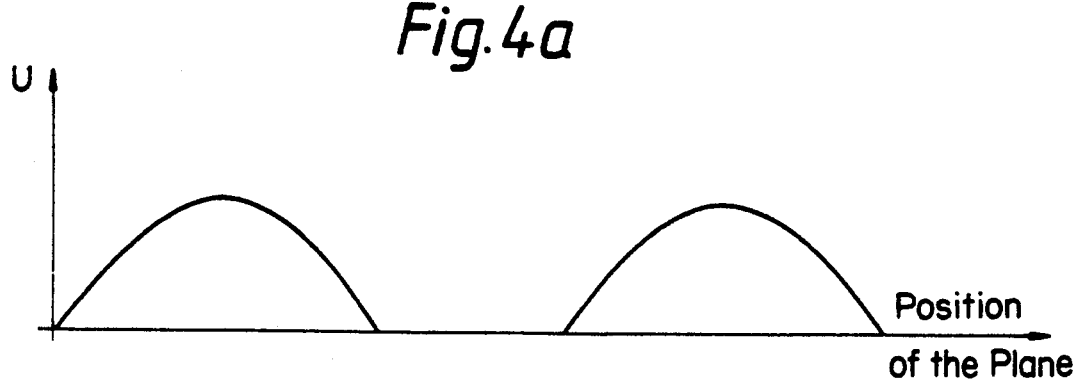
FIGS. 4a-4c show different definition signal curve representations on the basis of the various displacement positions of the autofocusing objectives represented in dashed lines in FIG. 3.
Figure 4B:
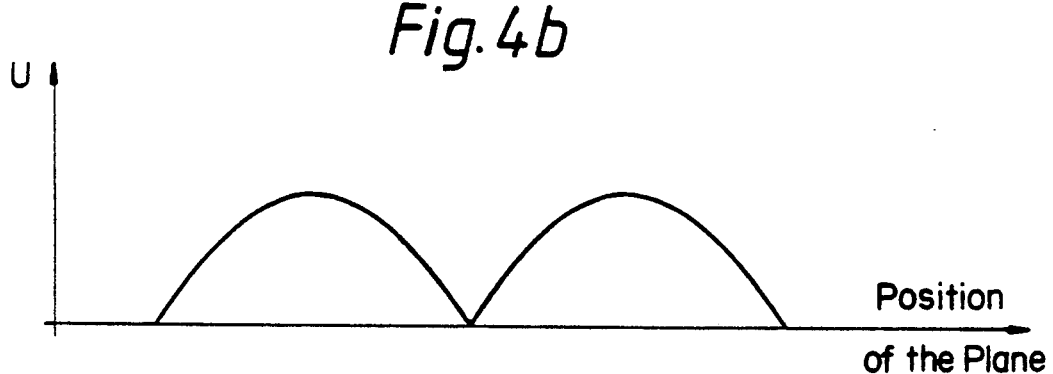
Figure 4C:
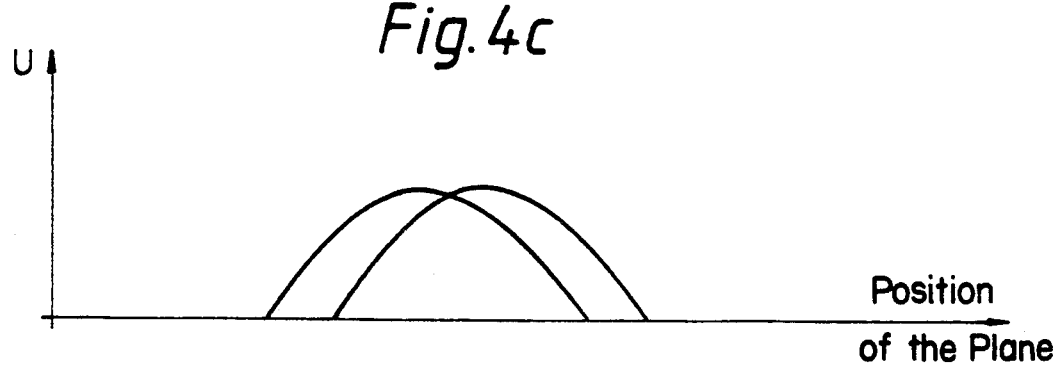

FIG. 4 shows various definition signal curves purely schematically. These representations correspond in principle to those signal response diagrams which are described, for example, in the already-mentioned DE-OS 3,707,487 and are shown in a drawing in FIG. 3 therein. The pairs of curves shown in FIGS. 4a, 4b and 4c correspond to the part of the curve shown by a dotted and dashed line above the abscissa in FIG. 3, detail view IV in DE-OS 3,707,487.

In FIG. 4a, the two definition signal curves are a long way apart from one another. The left-hand curve corresponds, for example, to the signal response which would be determined via the detector 13', and the right-hand curve corresponds to that signal response which would be determined by the detector 13. The large intermediate region between the two curves represents an undefined region with the consequence that the autofocusing system stops in an uncontrolled manner at some point. The response of the definition signal curves shown in FIG. 4a corresponds to the positions B and B' respectively of the autofocusing objectives 12 and 12' respectively in FIG. 3 of the present application.

In FIG. 4b, the two definition signal curves touch one another. This depiction represents the correct position of the autofocusing system. In FIG. 3, this corresponds to the position C and C' respectively of the two autofocusing objectives 12 and 12' respectively. This is the optimization position, that is to say the position of the two partial images with respect to the respective detectors 13, 13' (or TV targets) is set depending on the objective/magnification changer combination 2, 4 which has just been selected such that the same distance in front of and behind the respective target is provided. This is achieved by means of a displacement or relative change, coupled to the objective/magnification changer combination 2, 4, in the distance between the autofocusing objective 12 or 12' respectively on the one hand and the associated detector 13 or 13' respectively on the other hand.

This leads to a symmetry position, that is to say an equal distance in front of and behind the respective target. This curve optimization, which at the same time corresponds to "optimization" of the definition position, takes place by equal and opposite displacement of the two detectors 13, 13' or of the partial images (with the aid of the autofocusing objectives 12, 12').

In FIG. 4c, the two definition curves overlap considerably. In FIG. 3, this corresponds to the position D and D' respectively of the two autofocusing objectives 12 and 12' respectively. The resulting signal difference is too small to be of use.

Figure 5:
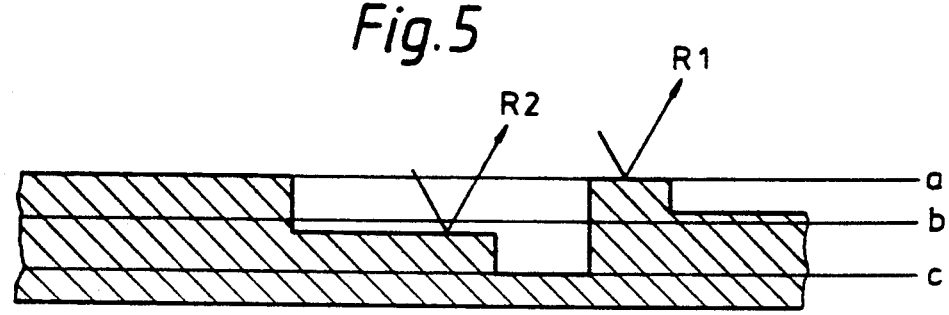
FIG. 5 shows a profile representation of a wafer structure having various focusing positions.

FIG. 5 shows a greatly enlarged vertical section of the profile of a semiconductor structure. The solid line reproduces the topology contour of this object. In the case of the symmetry position which is explained in detail above, and in which the images of the object structure are located at the same distance in front of and behind the respective detector 13, 13', the object is adjusted in a plane which corresponds to the mean value of the surfaces of the "hills" (raised object surface regions) and "valleys" (depressed object surface regions) and their respective reflection capabilities $R_1$, $R_2$, etc. This "natural adjustment"—cf. the plane b shown by a dashed line in FIG. 5—corresponds to the response of the definition signal curves shown in FIG. 6b. By displacement of the two detectors 13, 13'—in the representation in FIG. 2, this is a parallel displacement of the two detectors 13, 13'—or of the two images (that is to say the two autofocusing objectives 12, 12'), the focusing plane which is projected back to the object space, and hence the plane which is observed on the object, can be adjusted as desired by the observer.

The capability for a so-called "offset adjustment" for stepped objects, for example wafers, represents a significant advantage of this present invention. The focusing setting, which is marked in FIG. 5 by the line a, corresponds to the relative position of the signal definition curve pair in FIG. 6a. The associated "offset" magnitude is marked. In an analogous manner, the representation of the focusing plane c in FIG. 5 corresponds to the curve representation in FIG. 6c. Once again, the "offset" magnitude pointing in the opposite direction is drawn in.

Figure 7:
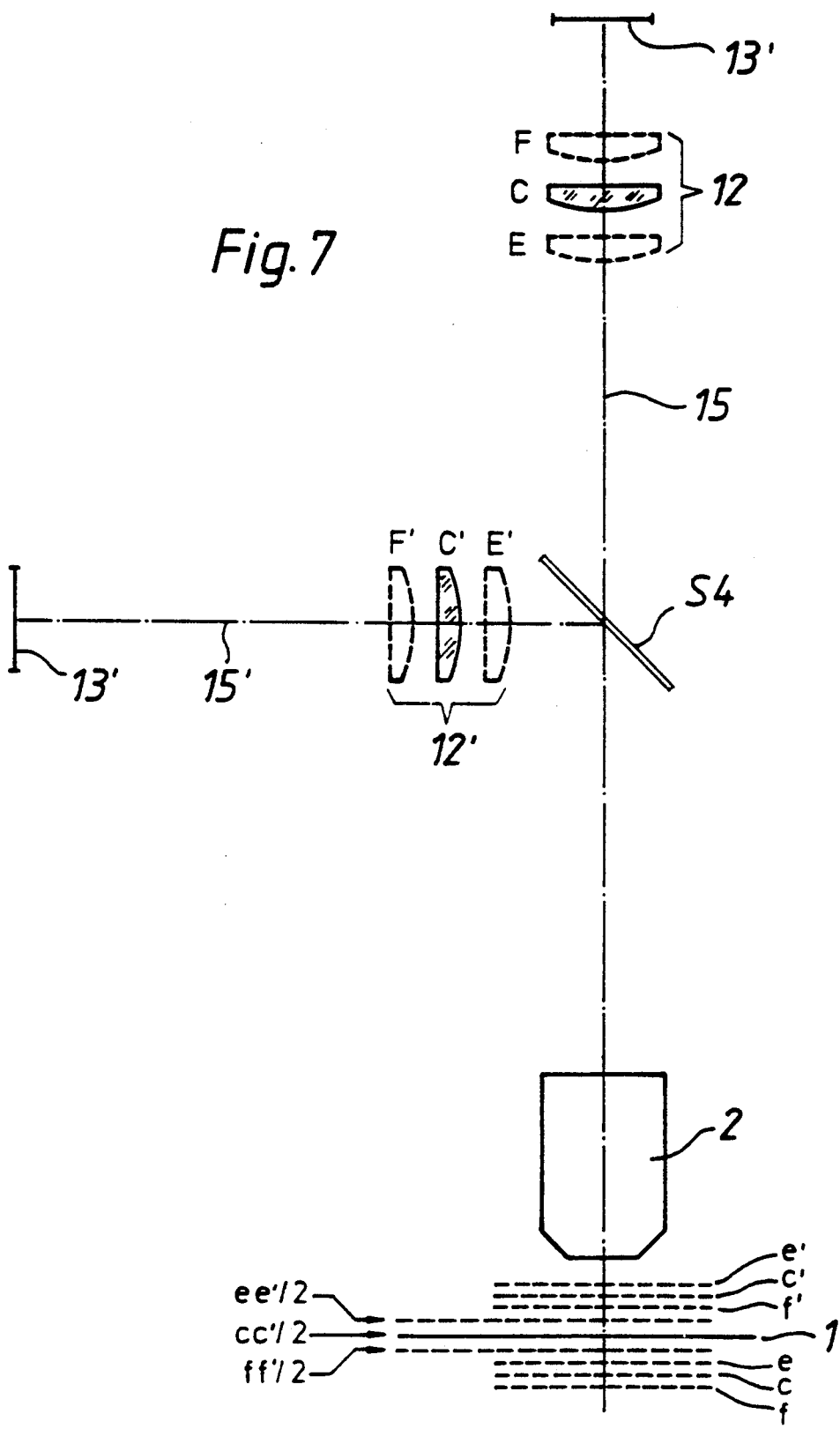
FIG. 7 shows a detailed representation according to FIG. 1 in order to explain "offset" settings.

FIG. 7 shows a detailed representation from FIG. 1 and FIG. 3 in order to explain "offset" adjustments. If one wishes to set, for example, the "offset" plane ee'/2, which lies above the "normal" level of the object plane 1, then the autofocusing lens 12' must occupy position E' and the autofocusing lens 12 must occupy the position E, by displacement in the opposite direction. An offset adjustment underneath the object plane 1, for example at the level of the "offset" plane ff'/2, is reached by the autofocusing lens 12' occupying the position F' and the autofocusing lens 12 occupying the position F in the opposite direction.

Figure 6A:
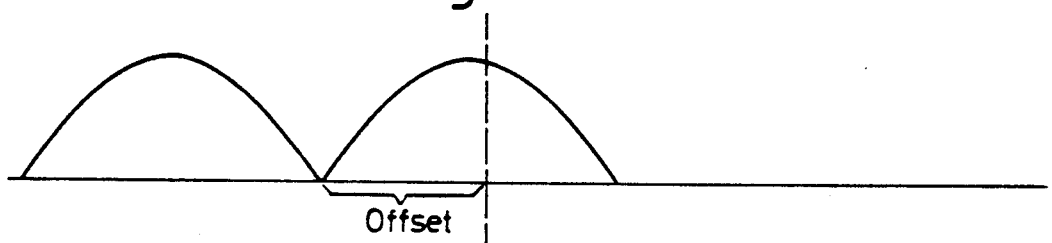
FIGS. 6a-6c show definition signal curve responses in order to show "offset" settings.
Figure 6B:
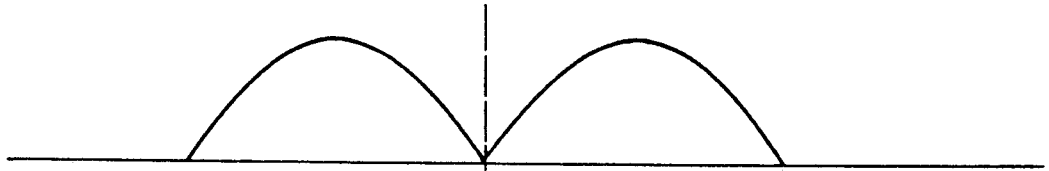
Figure 6C:
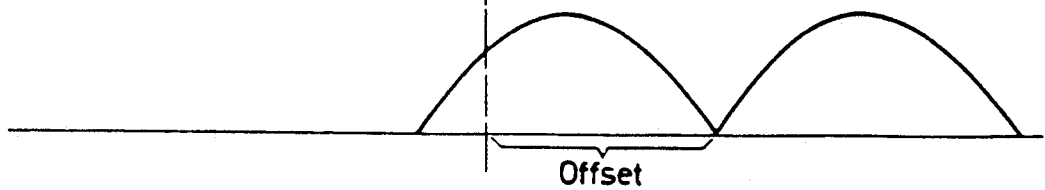

The positions E and E' of the autofocusing objective pair 12 and 12' correspond in FIG. 5 to the offset plane a and to the curve representation according to FIG. 6a; the positions C and C' of the objectives 12 and 12' correspond in FIG. 5 to the plane b and to the curve response from FIG. 6b, and the positions F and F' of the objectives 12 and 12' correspond in FIG. 5 to the offset plane c and to the curve representation according to FIG. 6c.

Figure 8:
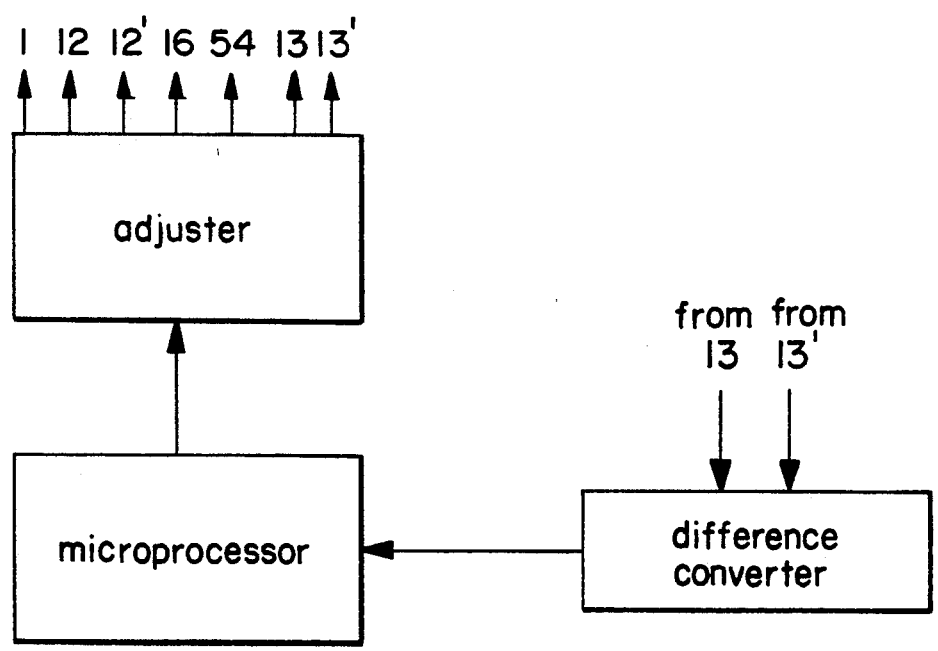
FIG. 8 is a schematic diagram of the adjustment control of the autofocusing system.

The adjustments required to reach the correct position can be controlled by a microprocessor shown in FIG. 8 and take place in synchronism with the operation of the objective/magnification changer combination. The distances being adjusted may also be stored by the microprocessor. The adjustment can be preselected by the microprocessor, especially by altering the distances in the same direction and by the same amount. The adjustment may be performed by displacing and/or tilting any of the optical components in the two detection region beam path, such as the lenses 12, 12', the deflection prism 16, and the beam splitter S4. The adjustment may alternatively be achieved by displacing and/or tilting the detector regions. The object surface 1 may also be displaced in order to achieve focus on the object. Further, any combination of these adjustments may be employed. The microprocessor can control the adjustment of the system either in accordance with the difference between the signals output by the detector regions or according to preselected adjustments stored in the microprocessor.

Finally, a particular advantage of the autofocusing system according to the invention is that the focusing error (focusing difference) caused by the wavelength difference between visible light and IR light, which has a different magnitude for each objective/magnification changer combination, can be corrected for by coupled adjustment of the detectors 13, 13' and of the partial images (that is to say of the autofocusing objectives 12, 12'). These "IR offset" correction values can be stored electronically in a microprocessor in a known manner.

Other designs within the spirit and scope of the invention will be apparent to those skilled in the field after receiving the above teaching. The invention, therefore, is defined with reference to the following claims.

What is claimed is:

1. A method for autofocusing a microscope having at least one objective magnification, comprising the steps of:
   supplying a first image of an object to a first detector region and a second image to a second detector region, wherein said images are obtained from radiation coming from said object and passing through said objective;
   producing said first image in front of and said second image behind said respective detector regions in the object-in-focus position;
   converting said images on said detector regions into electronic signals which vary in opposite directions when the distance between said object and said objective is altered, at least in a region which lies adjacent to a definition setting plane and contains said plane;
   generating at least one control signal from the signals;
   displacing the object and/or objective in a direction of an optimum definition setting in response to said control signal;
   compensating for changes in said electronic signals caused by a change in an objective magnification in order to achieve autofocusing for the respective objective magnification; and
   adjusting the distances from the images of the object to the respective detector region.

2. The method as recited in claim further comprising the step of;
   projecting a pattern containing light-dark contrasts onto an object plane during operation, by means of direct illumination prior to said adjusting step.

3. The method as recited in claim 1, wherein the adjusting of the distances between the images of said object and the respective detector region takes place by displacing and/or tilting optical components of said microscope.

4. The method as recited in claim 1, wherein the adjusting of the distances takes place by displacing and/or tilting of said detector regions.

5. The method as recited in claim 1, wherein the adjusting of the distances takes place by displacing and/or tilting both of optical components of said microscope and of said detector regions.

6. The method as recited in claim 1, wherein the adjusting of the distances takes place by offsetting said object surface by a preselected distance.

7. The method as recited in claim 1, wherein the adjusting of the distances is stored by an associated microprocessor.

8. The method as recited in claim 7, wherein the microprocessor-controlled adjusting takes place synchronously with an operation of the objective/magnification changer combination.

9. The method as recited in claim 6, wherein the adjusting for achieving said offset can be specifically preselected via a microprocessor, especially by displacing the two distances in the same direction and by the same amount in each case.

10. A microscope having an objective with a variable magnification comprising:
    an autofocusing system whose beam path passes through said objective;
    two detector regions receiving two images from said beam path and outputting corresponding electrical signals, wherein a first image is produced in front of, and a second image behind, the respective detector region in the focusing position;
    means for converting said output electrical signals of image definitions on said detector regions to a difference which is used to set the definition of said object;
    at least one optical system being incorporated in said beam path of said autofocusing system, wherein said optical system changes a scale of the image produced on said detector regions when an objective magnification changes; and
    means for changing a relative distance between the images of the object and said detector regions.

11. The microscope as recited in claim 10, further comprising:
    a pattern containing light-dark contrasts being arranged in a plane which is conjugate to an object plane; and
    an illumination source and a partially transparent mirror or prism arranged in said beam path, projecting said pattern onto the object plane.

12. The microscope as recited in claim 10, wherein said changing means comprises means for moving optical components which are held in a variable location and/or position.

13. The microscope as recited in claim 10, wherein said changing means comprises means for moving said detector regions.

14. The microscope as recited in claim 10, wherein a microprocessor is associated with said changing means.

15. The microscope as recited in claim 10, wherein said changing means are connected via a coupling mechanism to the respective objective/magnification changer combination.

16. The microscope as recited in claim 10, wherein said detector regions are in two separate detectors.

17. The method as recited in claim 1, wherein said detector regions are on two separate detectors.

* * * * *